United States Patent [19]

Meyer

[11] Patent Number: 4,543,831
[45] Date of Patent: Oct. 1, 1985

[54] OPTICAL PRESSURE TRANSDUCER

[75] Inventor: Wolfgang Meyer, Henstedt-Ulzburg, Fed. Rep. of Germany

[73] Assignee: U.S. Philips Corporation, New York, N.Y.

[21] Appl. No.: 468,225

[22] Filed: Feb. 22, 1983

[30] Foreign Application Priority Data

Feb. 25, 1982 [DE] Fed. Rep. of Germany ....... 3206720

[51] Int. Cl.⁴ .............................................. G01L 9/00
[52] U.S. Cl. ....................................... 73/705; 73/717; 250/231 P
[58] Field of Search .......................... 73/705, 723, 717; 250/231 P

[56] References Cited

U.S. PATENT DOCUMENTS 3,509,767  5/1970  Greer .................................... 73/705
4,428,239  1/1984  Johnston ............................... 73/705

FOREIGN PATENT DOCUMENTS 53-133053 11/1978 Japan .

Primary Examiner—Donald O. Woodiel
Attorney, Agent, or Firm—Robert T. Mayer; Bernard Franzblau

[57] ABSTRACT

Optical pressure transducers are used in devices for the measurement of the pressure of explosive gasses and liquids. In order to increase the sensitivity of the optical pressure transducer, the diaphragm (3) is made to be reflective on both sides. Two pairs of light conductors, each comprising a first light conductor (10, 11) for a light emission and a second light conductor (12, 13) for intercepting the light reflected by the diaphragm (3), are arranged on opposite sides of the diaphragm.

6 Claims, 2 Drawing Figures

OPTICAL PRESSURE TRANSDUCER

This invention relates to an optical pressure transducer, comprising an at least partly reflective diaphragm, the ends of a pair of light conductors being so disposed relative to said diaphragm that a light beam which is applied to the first light conductor by a transmitter and which emerges from the end thereof is intercepted, after reflection from the diaphragm, by the end of the second light conductor in order to be applied, via the second light conductor, to a comparator/receiver which is electrically connected to an evaluation circuit.

Optical pressure transducers are used in devices for the measurement of the pressure of explosive gases and liquids. From DE-OS No. 24 50 080 an optical pressure transducer is known in which light is transmitted via light conductors and is received again via a further light conductor after reflection from a reflective diaphragm. The diaphragm is elastic and the amount of light output depends on the pressure-dependent deflection of the diaphragm. This optical transducer is comparatively insensitive to pressure variations.

It is an object of the invention to increase the sensitivity of the optical pressure transducer without reducing its measuring range.

To this end, the pressure transducer in accordance with the invention is characterized in that the diaphragm is made to be at least partly reflective on both sides, a pair of light conductors being arranged on each side of the diaphragm, both pairs of light conductors cooperating with a common transmitter and a common evaluation circuit. The sensitivity of this transducer is increased in that in reaction to the deflection of the diaphragm, the end of the second light conductor on one side of the diaphragm intercepts an increasing amount of light, whereas the end of the second light conductor on the other side of the diaphragm intercepts a decreasing amount of light. Thus, in reaction to a deflection of the diaphragm, two measured values which vary in opposite directions are applied to an evaluation circuit. The evaluation circuit can thus also calculate pressure variations which cause only very small variations of the diaphragm deflection. The pressure transducer is also suitable for flow measurements because it is capable of performing the necessary differential pressure measurements.

A preferred embodiment is characterized in that the end of the first light conductor of one pair is situated along the prolongation of the end of the second light conductor of the other pair, while the end of the second light conductor of one pair is situated along the prolongation of the end of the first light conductor of the other pair, the half of the diaphragm which is situated near the first or near the second light conductors being at least partly reflective while its other half is at least partly transparent, all ends being directed towards the boundary between the reflective part and the transparent part. The sensitivity of the pressure transducer is thus further increased.

Embodiments in accordance with the invention will be described in detail hereinafter with reference to the drawings in which.

Figure 1:
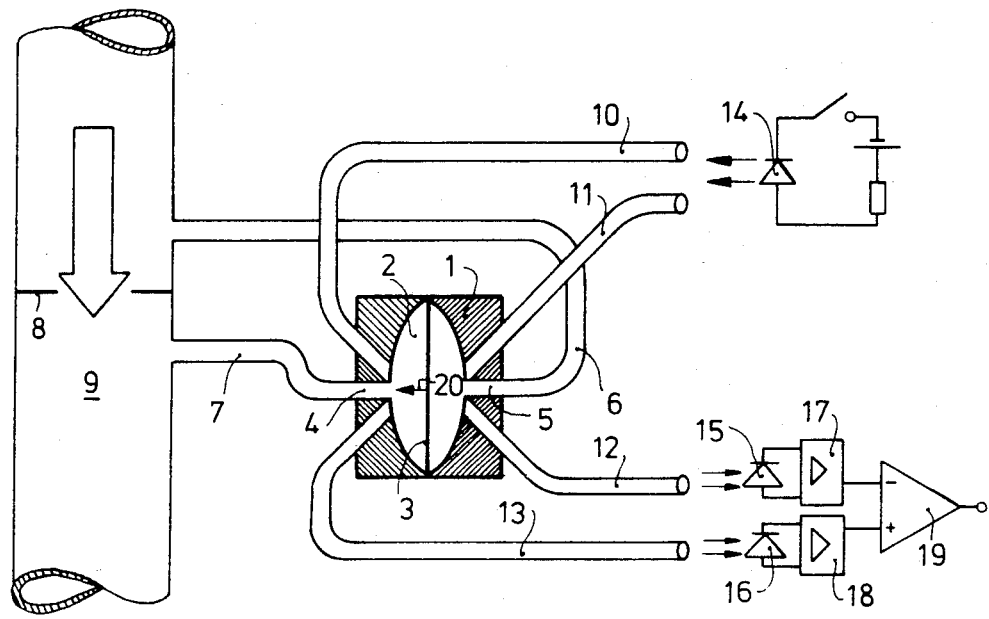
FIG. 1 shows an optical pressure transducer which forms part of an optical flow meter.

FIG. 1 shows an optical pressure transducer 1 whose measuring space 2 is subdivided by a diaphragm 3 which is reflective on both sides. The openings 4 and 5 in the pressure transducer connect the measuring space 2, via ducts 6 and 7, to a tube 9 on both sides of a constriction 8 formed in the tube 9. Ends of first light conductors 10, 11 and of second light conductors 12, 13 are arranged pair-wise on both sides of the diaphragm 3 which is reflective on both sides. In the rest condition of the diaphragm 3, the same amount of light is intercepted by the second light conductors 12 and 13 in order to be emitted to the receivers 15 and 16. The voltages applied to the evaluation circuit 19 by the amplifiers 17 and 18 are thus equal and the output voltage of the evaluation circuit 19 is zero. The first light conductors are optically coupled to a transmitter 14, for example, a light emitting diode. The receivers 15 and 16 may comprise photodiodes. The flow of gas or liquid in a tube 9 is measured by the pressure transducer 1 by means of the constriction 8 in the tube. The flow can be calculated from the pressure difference on opposite sides of the constriction 8. Therefore, the measuring space 2 of the pressure transducer is connected via the ducts 6 and 7 to the tube 9 on opposite sides of the constriction 8 so that the liquid pressure prevailing on both sides of the constriction 8 can act directly on the diaphragm 3 via the ducts 6 and 7. When liquid flows through the tube 9 in the direction denoted by the arrow, in front of the constriction 8 (viewed in the direction of the arrow) a pressure prevails which is higher than that behind the constriction 8. Thus, via the duct 6 a pressure acts on the diaphragm 3 which is higher than that acting thereon via the duct 7. As the diaphragm 3 is deflected further in the direction 20, more of the light which is emitted by the first light conductor 10 and which is reflected by the diaphragm 3 will be coupled into the second light conductor 13 and less of the light which is emitted by the first light conductor 11 and which is reflected by the diaphragm 3 will be coupled into the second light conductor 12. Because the voltage then applied to the evaluation circuit 19 by the amplifier 18 is higher than the voltage applied thereto by the amplifier 17, the output signal of the evaluation circuit 19 will have a positive value when the diaphragm is deflected in the direction 20.

Figure 2:
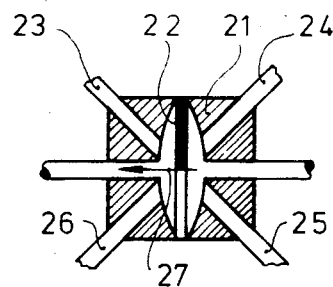
FIG. 2 shows an optical pressure transducer with a diaphragm, only one half of which is reflective on both sides.

The pressure transducer 21 shown in FIG. 2 comprises an elastic diaphragm 22 whose upper half is relfective on both sides and whose lower half is transparent. The end of the first light conductor 23 of one pair is situated along the prolongation of the end of the second light conductor 25 of the other pair. The end of the second light conductor 26 of one pair is situated along the prolongation of the end of the first light conductor 24 of the other pair and all ends are directed towards the boundary between the reflective and the transparent part in the center of the diaphragm.

FIG. 2 shows the rest condition of the diaphragm 22. Half of the light which is coupled into the pressure transducer 21 via the first light conductor 24 is reflected by the upper, reflective part of the diaphragm in order to be projected onto the end of the associated second light conductor 25, while the other half of the light passes through the transparent part of the diaphragm 22 and reaches the end of the other second light conductor 26. Thus, in this rest condition of the diaphragm 22, the same amount of light is coupled into the second light conductor 25 and the second light conductor 26. When the diaphragm 22 is deflected in the direction of the arrow 27, the part of the light which is coupled into the pressure transducer 21 by the first light conductor 24 and which passes through the transparent part of the diaphragm 22 increases, and hence also the amount of light intercepted by the second light conductor 26. The part of the light which is supplied by the first light conductor 24 and which is reflected by the diaphragm 22 to the second light conductor 25, however, decreases. The processing of the measurement values in a pressure measuring device comprising a pressure transducer 21 can be performed in the same way as with the pressure transducer 1.

The amount of light coupled into the second light conductor 26 when the diaphragm 22 is deflected in the direction 27 is further increased when light is coupled into the pressure transducer 21 not only via the first light conductor 24 but also via the first light conductor 23, because in reaction to the deflection of the diaphragm 22 in the direction 27 not only the light which is supplied by the first light conductor 24 and which passes through the transparent part of the diaphragm 22 increases, but also the light which is supplied by the first light conductor 23 and which is reflected by the reflective part of the diaphragm 22 so that it is projected onto the end of the second light conductor 26. The total amount of light intercepted by the second light conductors 25 and 26 is thus increased over that of the embodiment of FIG. 1. The sensitivity of the overall measuring device is thus increased.

What is claimed is:

1. An optical pressure transducer comprising: a housing having a measuring space formed therein, a diaphragm mounted in the measuring space so as to be deflected by a differential pressure to be measured such that the deflection is indicative of the pressure difference, opposite sides of said diaphragm being partly reflective and partly transparent to light, a first pair of light conductors each having one end thereof optically disposed relative to one side of the diaphragm so that a light beam applied to a first light conductor thereof emerges from said one end of the first light conductor and is received at said one end of a second light conductor of the first pair after reflection from the reflective part of the diaphragm, a second pair of light conductors each having one end thereof optically disposed relative to the opposite side of the diaphragm so that a light beam applied to a first light conductor thereof emerges from said one end of the first light conductor and is received at said one end of a second light conductor of the second pair after reflection from the reflective part of the diaphragm, said light conductors being disposed so that the end of the first light conductor of one pair is situated along a prolongation of the end of the second light conductor of the other pair, and the end of the second light conductor of the one pair is situated along a prolongation of the end of the first light conductor of the other pair, all of said one ends of the light conductors being directed towards a boundary between the reflective part and the transparent part of the diaphragm, and means for applying a pressure difference across the diaphragm.

2. An optical pressure transducer as claimed in claim 1 wherein one half of the diaphragm is at least partly reflective on opposite sides thereof and the other half thereof is at least partly transparent.

3. An optical pressure transducer as claimed in claim 1 wherein said pressure difference applying means comprises first and second ducts communicating with said measuring space on respective opposite sides of the diaphragm.

4. An optical pressure transducer as claimed in claim 1 further comprising, light detector means disposed to receive light beams from the other ends of the second light conductors of the first and second pairs of light conductors, and a common source of light optically coupled to the other ends of the first light conductors of said first and second pairs of light conductors.

5. An optical pressure transducer as claimed in claim 4 further comprising a comparator/receiver coupled to said light detector means, and a common evaluation circuit electrically coupled to the comparator/receiver.

6. An optical pressure transducer comprising: a housing having a measuring space formed therein, a diaphragm mounted in the measuring space so as to be deflected by a differential pressure to be measured such that the deflection is indicative of the pressure difference, said diaphragm being at least partly reflective on opposite sides thereof, a first pair of light conductors optically coupled to one side of the reflective diaphragm so that a light beam applied to a first light conductor thereof emerges from an end thereof and is received, after reflection from the reflective diaphragm, by a second light conductor thereof, a light detector disposed to receive the reflected light received by the second light conductor, a second pair of light conductors optically coupled to the opposite side of the reflective diaphragm so that a light beam applied to a first light conductor of the second pair emerges from an end thereof and is received, after reflection from the reflective diaphragm, by a second light conductor of the second pair, wherein ends of said first light conductors that optically cooperate with the reflective diaphragm emit light beams at a non-perpendicular angle relative to the surface of the diaphragm in the rest condition thereof, and a light detector disposed to receive the reflected light received by the second light conductor of the second pair, said first and second pairs of light conductors being disposed relative to said diaphragm so that a pressure difference applied across the diaphragm deflects the diaphragm such that the amount of light received by one of said second light conductors increases and the amount of light received by the other one of said second light conductors decreases.

* * * * *